(12) United States Patent
Kwon et al.

(10) Patent No.: US 8,363,931 B2
(45) Date of Patent: Jan. 29, 2013

(54) SYSTEM, MEDIUM, AND METHOD CONVERTING COLORS

(75) Inventors: Jae-hyun Kwon, Yongin-si (KR); Seong-deok Lee, Suwon-si (KR); Hyun-wook Ok, Seoul (KR); Jussi Parkkinen, Joesuu (FI); Tuija Jetsu, Joesuu (FI); Ville Heikkinen, Joesuu (FI)

(73) Assignee: Samsung Electronics Co., Ltd., Suwon-Si (KR)

( * ) Notice: Subject to any disclaimer, the term of this patent is extended or adjusted under 35 U.S.C. 154(b) by 1095 days.

(21) Appl. No.: 11/819,296

(22) Filed: Jun. 26, 2007

(65) Prior Publication Data

US 2008/0123949 A1 May 29, 2008

(30) Foreign Application Priority Data

Jun. 26, 2006 (KR) .................. 10-2006-0057662

(51) Int. Cl.
*G06K 9/00* (2006.01)
(52) U.S. Cl. ...................................... 382/162
(58) Field of Classification Search .................. None
See application file for complete search history.

(56) References Cited

U.S. PATENT DOCUMENTS

| | | | | |
|---|---|---|---|---|
| 4,992,963 A * | 2/1991 | Funt et al. | | 382/162 |
| 5,543,940 A * | 8/1996 | Sherman | | 358/518 |
| 5,967,050 A * | 10/1999 | Seymour | | 101/484 |
| 6,320,668 B1 * | 11/2001 | Kim | | 358/1.1 |
| 6,952,494 B2 * | 10/2005 | Odagiri et al. | | 382/162 |
| 6,980,231 B1 * | 12/2005 | Ohsawa | | 348/188 |
| 7,035,472 B2 * | 4/2006 | Nichogi et al. | | 382/239 |
| 7,283,244 B2 * | 10/2007 | Takagi | | 356/446 |
| 7,414,751 B2 * | 8/2008 | Yamazaki et al. | | 358/1.9 |
| 7,457,000 B2 * | 11/2008 | Uchino | | 358/1.9 |
| 7,548,341 B2 * | 6/2009 | Gotoh et al. | | 358/1.9 |
| 7,679,785 B2 * | 3/2010 | Ehbets et al. | | 358/1.9 |

(Continued)

FOREIGN PATENT DOCUMENTS

| | | |
|---|---|---|
| JP | 2002-112053 | 4/2002 |
| JP | 2002-281513 | 9/2002 |

(Continued)

OTHER PUBLICATIONS

"Differences between tristimulus method and spectrophotometric method", http://www2.konicaminolta.eu/eu/Measuring/pcc/en/part2/06.html, Konica Minolta Sensing, Inc, 2003.*

(Continued)

*Primary Examiner* — Samir Ahmed
(74) *Attorney, Agent, or Firm* — Staas & Halsey LLP (57) ABSTRACT

A system, medium, and method converting image colors, more particularly, a system, medium, and method converting image colors by estimating the surface spectral reflectance of a subject in one or more wavelength ranges based on an input color signal and by converting the input color signal into a device-independent color signal based on the estimated surface spectral reflectance. The system may include an image input unit receiving an image, a reflectance estimating unit estimating spectral reflectances of the image in one or more wavelength ranges, a reflectance synthesizing unit synthesizing the estimated spectral reflectances into one spectral reflectance, and a color converting unit converting the color of the image on the basis of the synthesized spectral reflectance.

12 Claims, 7 Drawing Sheets

U.S. PATENT DOCUMENTS

| | | | |
|---|---|---|---|
| 2003/0021472 A1* | 1/2003 | Nichogi et al. | 382/166 |
| 2003/0038954 A1* | 2/2003 | Odagiri et al. | 358/1.9 |
| 2004/0174549 A1* | 9/2004 | Shigeta | 358/1.9 |
| 2005/0012948 A1* | 1/2005 | Gotoh et al. | 358/1.9 |
| 2005/0231740 A1* | 10/2005 | Uchino | 358/1.9 |
| 2006/0238615 A1* | 10/2006 | Shigeta | 348/98 |

FOREIGN PATENT DOCUMENTS

| | | |
|---|---|---|
| JP | 2004-266590 | 9/2004 |
| JP | 2006-090897 | 4/2006 |
| KR | 10-0120581 | 8/1997 |

OTHER PUBLICATIONS

Notice of Allowance issued Jul. 24, 2007 in corresponding Korean Patent Application No. 10-2006-0057662.

Japanese Office Action mailed Jul. 28, 2009 during the examination of corresponding Japanese patent Application No. 2007-166625.

* cited by examiner

SYSTEM, MEDIUM, AND METHOD CONVERTING COLORS

CROSS-REFERENCE TO RELATED APPLICATIONS

This application claims priority from Korean Patent Application No. 10-2006-0057662 filed on Jun. 26, 2006 in the Korean Intellectual Property Office, the disclosure of which is incorporated herein by reference in its entirety.

BACKGROUND

1. Field of the Invention

One or more embodiments of the present invention relate to a system, medium, and method converting colors, and more particularly, to a system, medium, and method converting colors of an input image by estimating the surface spectral reflectance of the image in one or more wavelength ranges by converting the image into a device-independent color signal on the basis of the estimated surface spectral reflectance.

2. Description of the Related Art

Digital image devices for reproducing color images, such as monitors, scanners, and printers, have been developed in order to meet the user's demands for multi-function and high-quality image devices. These digital image devices use different color spaces or color models depending on their purposes. Color models, for example, are divided into device-dependent models and device-independent models. The device-dependent models include, for example, an RGB (red, green, and blue) model, which is an additive dependent model, and a CMYK color model, which is a subtractive color space model. The device-independent models include, for example, a CIE (Commission International de l'Eclairage) LAB model, a CIE XYZ model, and a CIE LUV model.

The CIE LAB model is a method of quantifying a color in spatial coordinates and representing the color by the values of L*(brightness), a*(red-green), and b*(yellow-blue). The CIE XYZ model represents RGB tristimulus values by a set of XYZ, which are different RGB tristimulus values all having positive values. Here, the CMYK color space is typically used in the printer fields and the RGB color space is typically used in the computer monitor fields, such as in the Internet and corresponding output graphics.

Such digital image devices may convert a specific color of an input image and output the converted color, as long as it can output the color of the input image. Therefore, the user may be able see an image that has been converted into a more natural color, for example.

Meanwhile, techniques for converting the color of an input image into a device-independent color include using surface spectral reflectance of a subject. However, devices for measuring the surface spectral reflectance are typically expensive, and may not be suitable for general electric appliances. Therefore, a technique for estimating the surface spectral reflectance on the basis of an input color signal, such as input to a digital camera, has been proposed. However, such a desired technique is not available due to an ill-posed problem in which the order of input data is larger than that of output data, which results in a large estimated errors in the surface spectral reflectance.

Therefore, the inventors herein believe that it would be desirable to have a technique for converting an input color signal into a device-independent color signal with limited error in surface spectral reflectance.

SUMMARY

An aspect of one or more embodiments of the present invention is to provide a technique for estimating the surface spectral reflectance of a subject in one or more wavelength ranges based on an input color signal and converting the input color signal into a device-independent color signal based on the estimated surface spectral reflectance.

Additional aspects and/or advantages of the invention will be set forth in part in the description which follows and, in part, will be apparent from the description, or may be learned by practice of the invention.

To achieve the above and/or other aspects and advantages, embodiments of the present invention include a color converting system, including a reflectance estimating unit to estimate spectral reflectances of an image in one or more wavelength ranges, a reflectance synthesizing unit to synthesize the estimated spectral reflectances into one spectral reflectance, and a color converting unit to convert the image into a different color model based on the synthesized spectral reflectance.

To achieve the above and/or other aspects and advantages, embodiments of the present invention include a color converting system, including an optical region dividing unit to divide a visible light region into one or more wavelength ranges, an image analyzing unit applying a kernel to an image in the respective wavelength ranges to calculate a spectral reflectance of the image, and a matrix creating unit to create a matrix for converting a spectral reflectance of a specific image into the calculated spectral reflectance when an error between the calculated spectral reflectance and a previously stored spectral reflectance, previously stored so as to correspond to the image, fails to meet an error threshold value.

To achieve the above and/or other aspects and advantages, embodiments of the present invention include a color converting method including estimating spectral reflectances of an image in one or more wavelength regions, synthesizing the estimated spectral reflectances into one spectral reflectance, and applying the synthesized spectral reflectance to the image to convert the image into a different color model.

To achieve the above and/or other aspects and advantages, embodiments of the present invention include a color converting method, including dividing a visible light region into one or more wavelength ranges, applying a kernel to an image in the respective wavelength ranges to calculate a spectral reflectance of the image, determining whether an error between the calculated spectral reflectance and a previously stored spectral reflectance, previously stored so as to correspond to the image, fails to meet a threshold value, and creating a matrix for converting a spectral reflectance of a specific image into the calculated spectral reflectance based on the determination.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
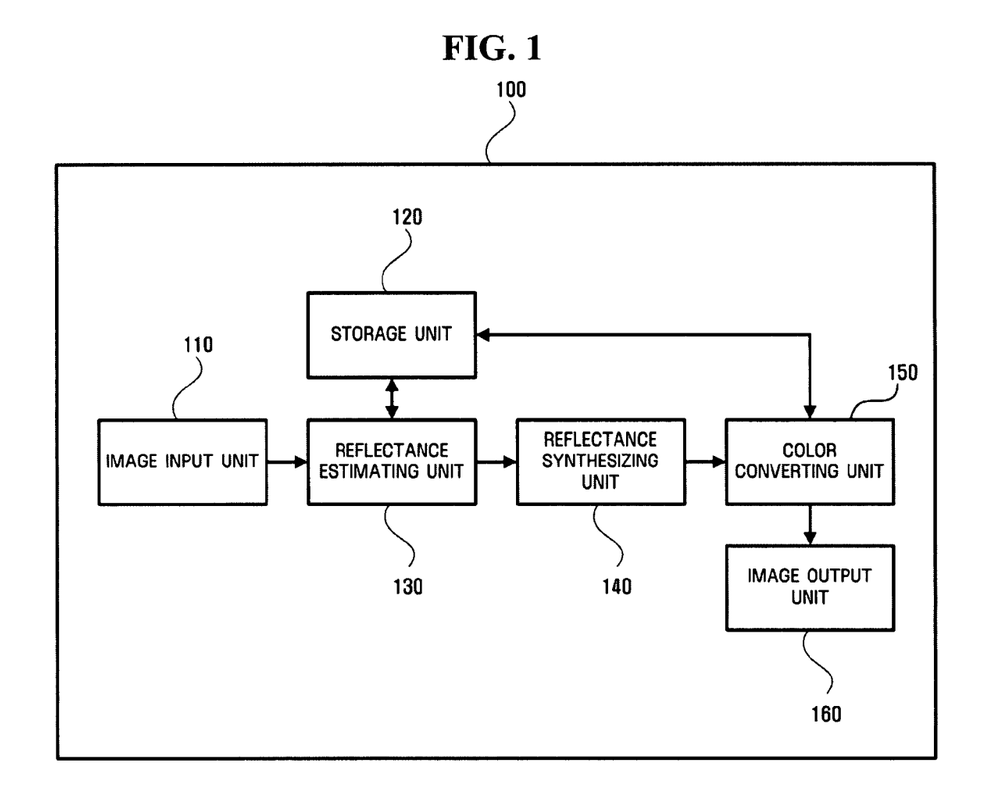
FIG. 1 illustrates a color converting system, according to an embodiment of the present invention.

FIG. 1 illustrates a color converting system, according to an embodiment of the present invention. The color converting system 100 may include an image input unit 110, a storage unit 120, a reflectance estimating unit 130, a reflectance synthesizing unit 140, a color converting unit 150, and an image output unit 160, for example.

The image input unit 110 may receive or obtain images. The images may be digital images or analog images, for example. In one embodiment, the image input unit 110 may convert an input analog image into a digital image.

The reflectance estimating unit 130 may estimate spectral reflectance of an input image in one or more wavelength ranges. The wavelength ranges may correspond to the visible light wavelength range, generally in the range of 380 nm to 770 nm, which may be changed, e.g., according to the condition of the human eye. In one embodiment, the reflectance estimating unit 130 may divide this wavelength range into a range of 380 nm to 510 nm, a range of 511 nm to 640 nm, and a range of 641 nm to 770 nm, for example, and estimate the spectral reflectance in each of the wavelength ranges.

The reflectance estimating unit 130 can estimate the spectral reflectance in each wavelength range by applying to the input image a predetermined matrix in each wavelength period. The matrix may be created based on the spectral reflectance information and color information of a specific image, and it may further be obtained by experiment. Therefore, it is possible to estimate the spectral reflectance of an image by appropriately applying the matrix to the image, which will be described in greater detail below with reference to FIG. 3.

Figure 2:
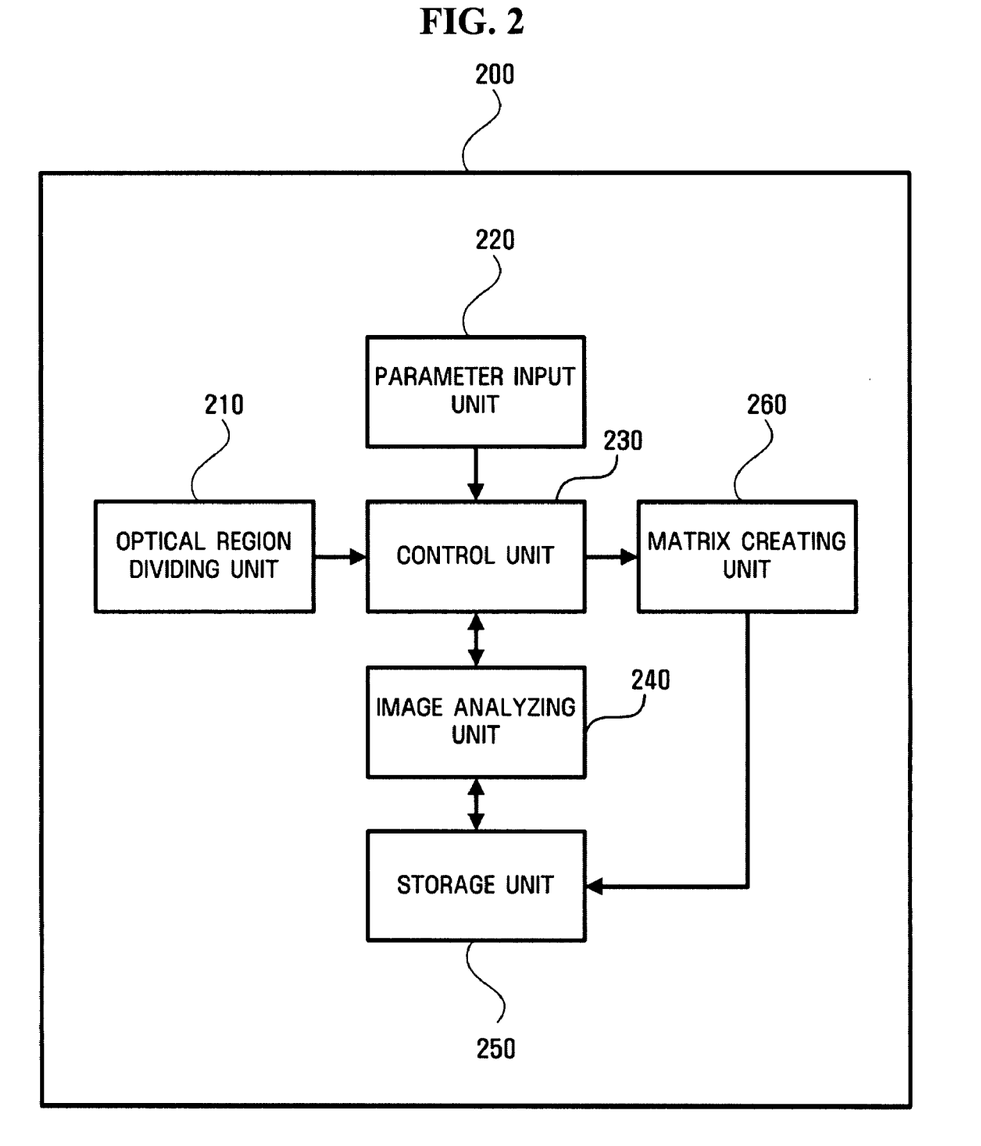
FIG. 2 illustrates a matrix creating system, according to an embodiment of the present invention.

FIG. 2 illustrates a system for creating such a matrix. The matrix creating system may be provided in or with the color converting system 100, or it may be formed of a separate system. In an embodiment, when the matrix creating system is provided in/with the color converting system 100, detailed values of color information of a specific image, spectral reflectance information thereof, and a matrix corresponding thereto may be updated by the selection of a user.

The storage unit 120 may store color information of one or more images, spectral reflectance information thereof, and a matrix corresponding thereto, for example. The storage unit 120 may be a module capable of inputting/outputting information, such as a hard disk, a flash memory, a CF (compact flash) card, an SD (secure digital) card, an SM (smart media) card, an MMC (multimedia) card, or a memory stick, for example, noting that alternative embodiments are equally available. In addition, the storage unit 120 may be provided in/with the color converting system 100, or it may be provided in a separate system.

The reflectance synthesizing unit 140 synthesizes one or more spectral reflectances estimated by the reflectance estimating unit 130 into one spectral reflectance. In an embodiment, the wavelength range formed by the reflectance estimating unit 130 may overlap adjacent wavelength ranges. In such an embodiment, the reflectance synthesizing unit 140 can connect the spectral reflectances of the overlapped ranges and remove a discontinuous range between the spectral reflectances at adjacent surfaces of the wavelength ranges.

The color converting unit 150 may further apply the spectral reflectance, e.g., synthesized by the reflectance synthesizing unit 140, to an image to convert the color of the image. For example, the color converting process by the color converting unit 150 may include a process of converting a device-dependent color model on an input image into a device-independent color model and/or a process of converting a device-independent color model on an input image into a device-independent color model and then converting the device-independent color model into the device-dependent color model.

For example, when the color model of an input image is an RGB (red, green, and blue) color model, the color converting unit 150 may convert the RGB color model into a CIE LAB color model, and may further convert the CIE LAB color model into the RGB color model or a CMYK color model.

To accomplish the conversion of the color model, the color converting unit 150 can use the spectral reflectance to calculate a CIE XYZ model for an image, and then calculate the RGB color model, the CMYK color model, or the CIE LAB color model based on the CIE XYZ model.

The image output unit 160 may further output the image having the converted color. The image output unit 160 may be a module provided with an image display device capable of displaying input image signals, for example, such as a cathode ray tube (CRT), a liquid crystal display (LCD), a light emitting diode (LED), an organic light-emitting diode (OLED), or a plasma display panel (PDP), and displays color information that is transmitted, noting that alternative embodiments are equally available.

FIG. 2 illustrates a system creating a matrix according to an embodiment of the present invention. The system creating a matrix 200, hereinafter, referred to as a matrix creating system, may include an optical region dividing unit 210, a parameter input unit 220, a control unit 230, an image analyzing unit 240, a storage unit 250, and a matrix creating unit 262, for example.

The optical region dividing unit 210 may divide the visible light region into one or more wavelength ranges. As described above, the visible light wavelength is generally within the range of 380 nm to 770 nm, and the optical region dividing unit 210 can divide the wavelength range into one or more wavelength ranges. In this case, the divided wavelength range and the number of divided wavelength ranges may be predetermined, e.g., by a user. For example, the wavelength range may be divided into a plurality of wavelength ranges having the same size, divided into a plurality of wavelength ranges having different sizes, or a mixture of the two.

The parameter input unit 220 may receive parameters of a kernel to be applied to a predetermined image for each wavelength range, e.g., from the user. The kernel may be a Gaussian kernel or a polynomial kernel as shown in the following Equations 1 or 2, but is not limited thereto. In an embodiment, the parameter input unit 220 may include an input unit, such as buttons, a touch panel, or a wheel, and receives the parameters of the kernel from the user.

$$k(x_i, x_j) = e^{-\frac{\|x_i - x_j\|}{2\sigma^2}} \qquad \text{Equation 1}$$

$$k(x_i, x_j) = ((x_i, x_j) + 1)^k \qquad \text{Equation 2}$$

In an embodiment, a user may continuously modify the parameters of the kernel and input the modified parameters in order to reduce errors between the spectral reflectances calculated by the control unit 230, which will be described in greater detail below, below a threshold value.

The storage unit 250 may store one or more images having different spectral reflectances, for example. The storage unit 250 may further store the matrix created by the matrix creating unit 260, described in greater detail below. In this case, the matrix may be stored in the storage unit 250 so as to correspond to a target image or spectral reflectance. In particular, when the matrix creating system 200 is provided in/with the color converting system 100, the storage units 120 and 250 may also be the same.

The image analyzing unit 240 may apply the parameters of the kernel, e.g., as input through the parameter input unit 220, to an image to calculate the spectral reflectance of the image. The image may include one of a plurality of images stored in the storage unit 250. The images stored in the storage unit 250 may be updated, e.g., by the user. In which case, the images may be selectively added, deleted, and edited by the user.

The image analyzing unit 240 may apply the kernel to an image by using a kernel ridge regression operation, for example, to calculate the spectral reflectance. The following Equation 3 represents the relationship among the color information, the spectral reflectance information, and the kernel ridge regression operation.

$$X_{test}W = K_{test}(K+\lambda I)^{-1} Y_{train} = Y_{test},$$   Equation 3

Here, $X_{test}$ indicates color information of input test data, W indicates a matrix, $K_{test}$ indicates a matrix composed of the result of the calculation of training data and test data by the kernel, λ indicates a regularization parameter, $Y_{train}$ indicates spectral reflectance that is stored so as to correspond to the training data, and $Y_{test}$ indicates output test data, which is spectral reflectance when kernel ridge regression is applied to an image.

Thus, in an embodiment, the image analyzing unit 240 can use Equation 3 to calculate spectral reflectances for a plurality of wavelengths of a specific image.

The control unit 230 checks whether the error between the spectral reflectance calculated by the image analyzing unit 240 and a spectral reflectance previously stored in the storage unit, so as to correspond to the image, is smaller than or fails to meet the threshold value. When the error is larger than or meets the threshold value, the control unit 230 causes the parameter input unit 220 to receive different parameters for the kernel, e.g., from the user. On the other hand, when the error is smaller than or fails to meet the threshold value, the control unit 230 may forward the color information of the image and the calculated spectral reflectance to the matrix creating unit 260.

The control unit 230 may generally control the optical region dividing unit 210, the parameter input unit 220, the image analyzing unit 240, the storage unit 250, the matrix creating unit 260, and the matrix creating system 200, for example.

The matrix creating unit 260 may, thus, create a matrix for converting the spectral reflectance, stored so as to correspond to the image, into the calculated spectral reflectance using the color information and the spectral reflectance forwarded from the control unit 230. In an embodiment, this matrix corresponds to "W" of the above Equation 3, and the matrix creating unit 260 can use Equation 3 to create the matrix W.

As described above, the matrix created by the matrix creating unit 260 may be stored in the storage unit 250 so as to correspond to the image.

Figure 3:
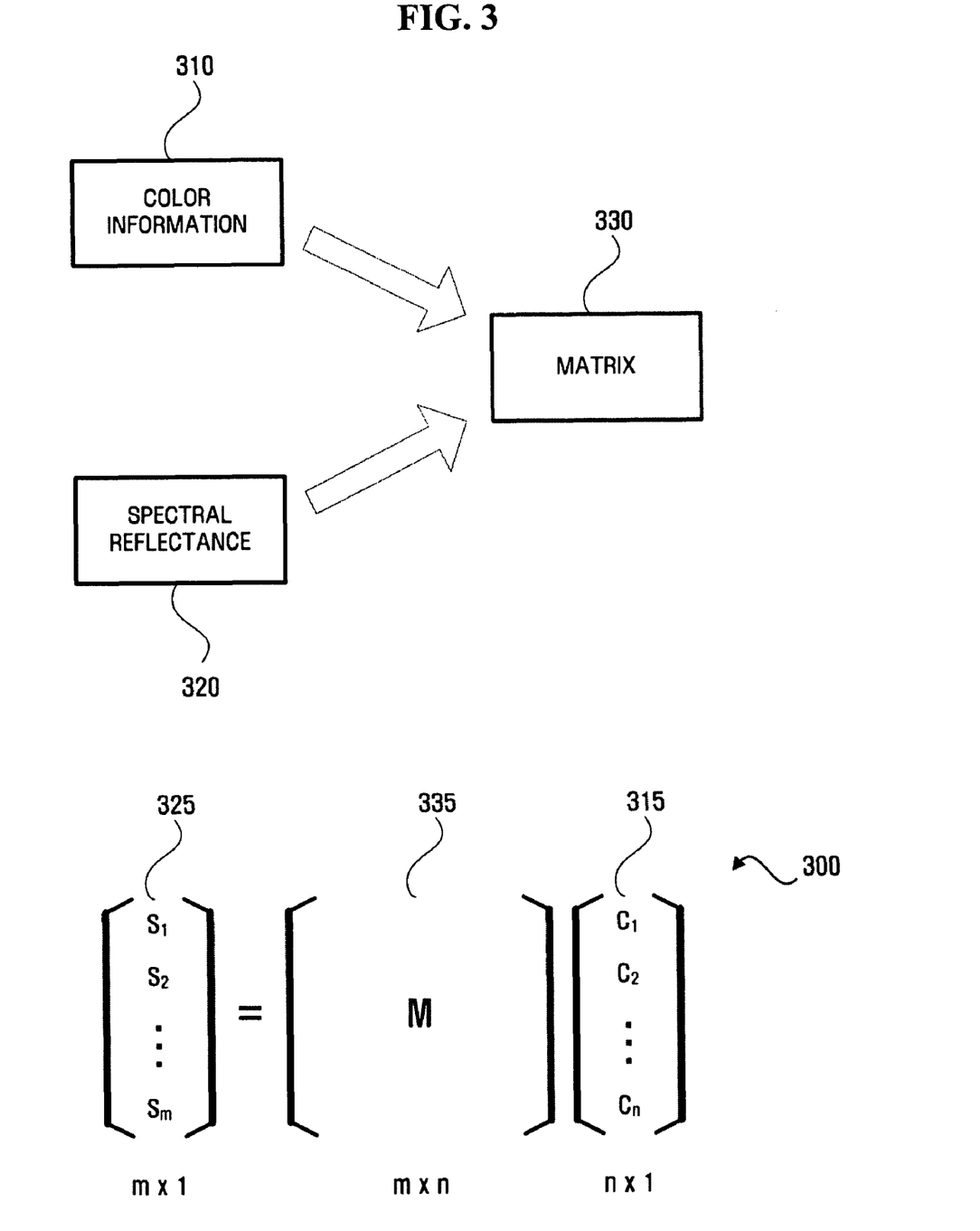
FIG. 3 illustrates a relationship among color information of a specific image, spectral reflectance information thereof, and a matrix.

FIG. 3 illustrates the relationship among a matrix, spectral reflectance, and color information of a specific image, according to an embodiment of the present invention.

The matrix creating system 200 may create a matrix 300 using color information 310 of a specific image and spectral reflectance 320 thereof. The color information 310 may be composed of a device-dependent color model, such as the RGB color model or the CMYK color model.

Reference numeral 300 represents a determinant indicating the relationship among the color information 310 of an image, the spectral reflectance 320, and the matrix 330. When the color information 310 is composed of the RGB color model, R (red), G (green), and B (blue) may be input as components of a matrix 315 representing the color information.

For example, Macbeth color checker or Munsel color chips may be used as spectral reflectance data. Therefore, reflectance made up of 24 or 1690, for example, colors may be used as the spectral reflectance, or reflectance made up of a plurality of colors that are selected by the user, for example, may be used as the spectral reflectance training data. Thus, the components of the matrix 325 representing the spectral reflectance may depend on the number of colors selected by the users, which determines the size of the matrix 325.

The reflectance estimating unit 130 of the color converting system 100 and the optical region dividing unit 210 of the matrix creating system 200 may determine the number of wavelengths to be divided based on the size of the matrix 325 indicating the spectral reflectance.

The image input unit 110 of the color converting system 100 may apply the matrix created in this way to each wavelength of the input image, which identifies the spectral reflectance for each wavelength. Then, the color converting unit 150 may perform the color conversion of the input image based on a composite of a plurality of estimated spectral reflectances.

Figure 4:
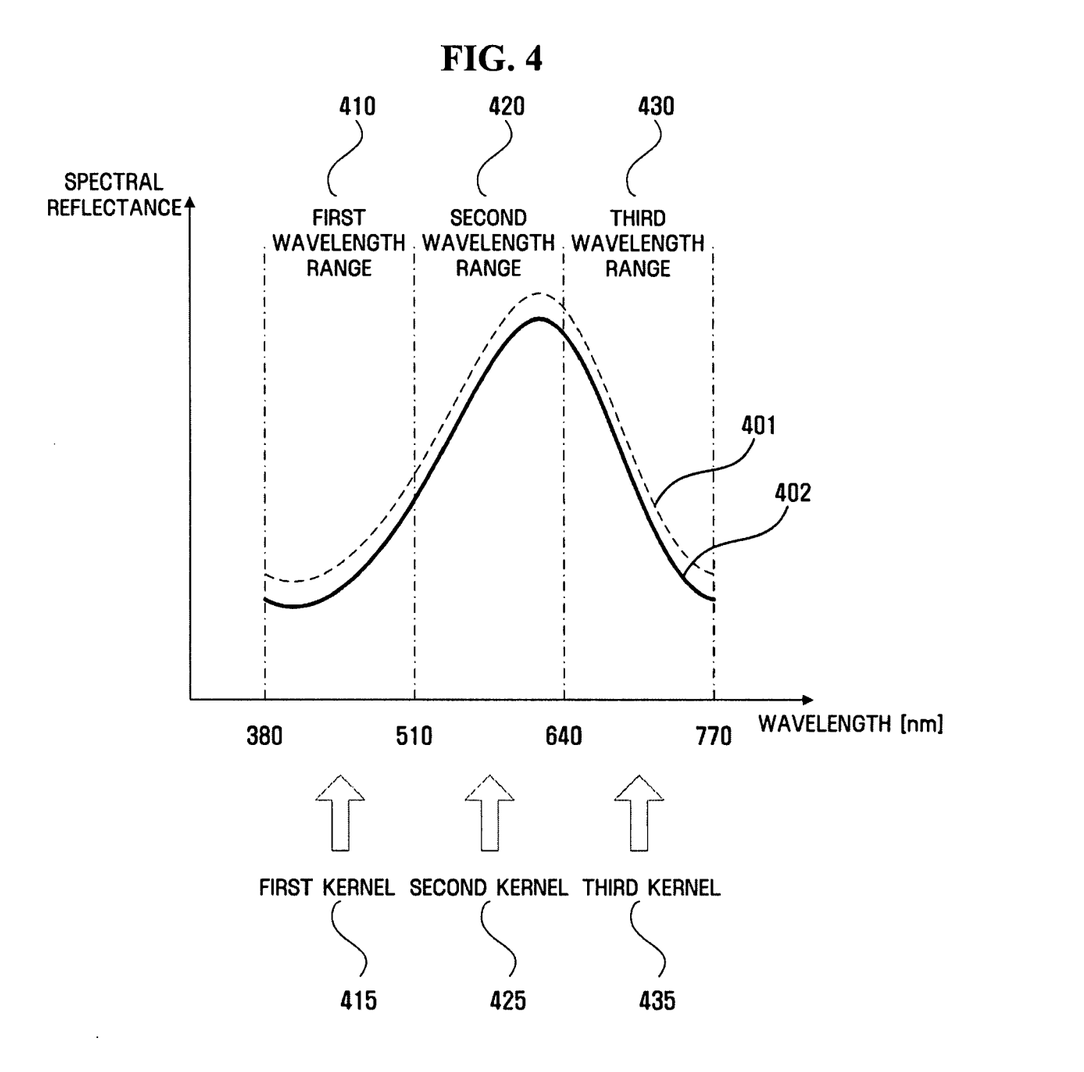
FIG. 4 illustrates an optical region divided into wavelength ranges, according to an embodiment of the present invention.

FIG. 4 illustrates an optical region divided into wavelength ranges, according to an embodiment of the invention. In the example of FIG. 4, one optical region is divided into three wavelength ranges 410, 420, and 430.

In the creation of the matrix, the optical region dividing unit 210 of the matrix creating system 200 may perform a process of dividing an optical region into one or more wavelength ranges. In this case, different kernels 415, 425, and 435 may be applied to the divided wavelength ranges 410, 420, and 430. That is, in one embodiment, the user may create different kernels through the parameter input unit 220, and apply the created kernels to the wavelength ranges, which permits the creation of a matrix.

In FIG. 4, the dotted line represents the original spectral reflectance 401 of a specific region, and the solid line represents spectral reflectance 402 that is estimated based on the matrix applied. In FIG. 4, when the first to third kernels 415, 425, and 435 are applied to the three wavelength ranges 410, 420, and 430, respectively, the spectral reflectances substantially equal to each other are obtained.

Meanwhile, the original spectral reflectance 401 may be different from the estimated spectral reflectance 402 in a specific wavelength region. For example, the original spectral reflectance 401 may be substantially equal to the estimated spectral reflectance 402 in the first and second wavelength ranges 410 and 420, but an estimated error of the spectral reflectances may increase in the third wavelength range 430. In this case, the matrix creating unit 260 of the matrix creating system 200 may create a matrix including only the first and second wavelength ranges 410 and 420. That is, the matrix creating unit 260 of the matrix creating system 200 may create a matrix that includes a specific wavelength range, but does not include the other wavelength ranges, and the matrix may be stored in the storage unit 250 such that it can be associated with the corresponding spectral reflectance and the corresponding wavelength range.

Figure 5:
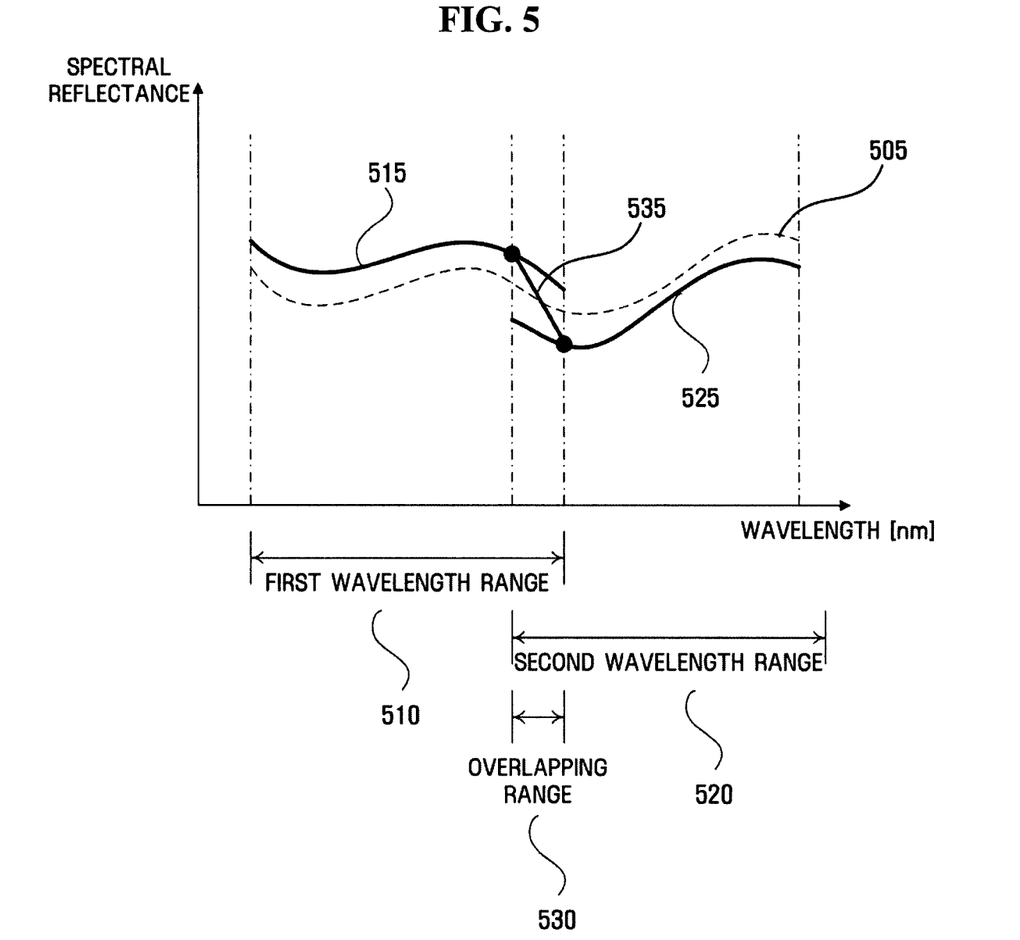
FIG. 5 illustrates an overlap of wavelength ranges of an optical region, according an embodiment of the present invention.

FIG. 5 illustrates an overlap of optical regions having different wavelength ranges.

As different kernels are applied to create a matrix, discontinuity in spectral reflectance may occur between adjacent wavelength ranges. In this case, for example, the reflectance estimating unit 130 of the color converting system 100 and the optical region dividing unit 210 of the matrix creating system 200 may divide an optical region into wavelength ranges such that the wavelength ranges of the optical region overlap each other.

As shown in FIG. 5, when an optical region is divided into a first wavelength range 510 and a second wavelength range 520, for example, an overlapping range 530 is formed between the first wavelength range 510 and the second wavelength range 520.

In an embodiment, the reflectance synthesizing unit 140 of the color converting system 100 and the image analyzing unit 240 of the matrix creating system 200 may further connect discontinuous portions of spectral reflectances 515 and 525 formed in the overlapping range 530. In this case, a technique of connecting the discontinuous portions in a straight line or an interpolation process, for example, of referring the wavelength of the spectral reflectance in each wavelength range may be used to connect the discontinuous portions.

Meanwhile, the discontinuity of the spectral reflectances 515 and 525 may occur due to the difference between offsets in the wavelength ranges. As shown in FIG. 5, the spectral reflectance 515 in the first wavelength range 510 (hereinafter, referred to as a first spectral reflectance) and the spectral reflectance 525 in the second wavelength range 520 (hereinafter, referred to as a second spectral reflectance) are substantially equal to the original spectral reflectance 505. However, since the discontinuity of the first spectral reflectance 515 and the second spectral reflectance 525 occur due to the difference between offsets, the discontinuity may be removed by changing one of the offsets.

For example, it is possible to remove the discontinuity of the first and second spectral reflectances 515 and 525 by increasing the offset of the second spectral reflectance 525 by a predetermined magnitude. In this case, after the offset of the second spectral reflectance 525 increases and then the error between the second spectral reflectance 525 and the original spectral reflectance 505 is detected, the change of the offset of the second spectral reflectance 525 may be determined.

Figure 6:
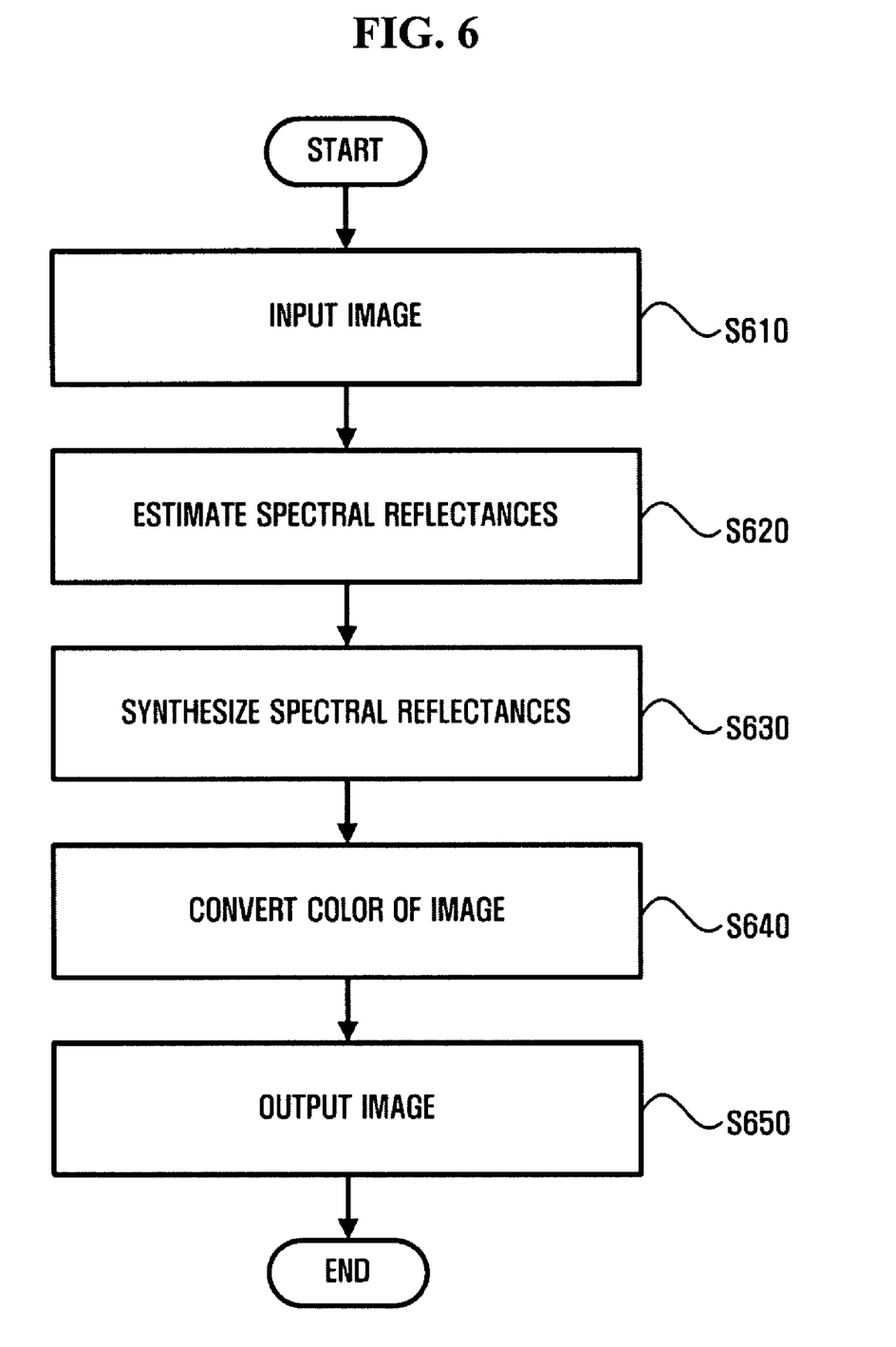
FIG. 6 illustrates a process of converting colors, according to an embodiment of the present invention.

FIG. 6 illustrates a process of converting colors, according to an embodiment of the present invention.

In order to convert a device-dependent color into a device-independent color, an image may be received, e.g., with the image input unit 110 of the color converting unit 100 receiving an image, in operation S610. The input image may be a digital image and include device-dependent color information such as RGB or CMYK, for example.

The input image may be forwarded to the reflectance estimating unit 130, for example, and the spectral reflectance of the input image may be estimated in one or more wavelength ranges, e.g., by the reflectance estimating unit 130, in operation S620. The wavelength ranges include all or a portion of the visible light wavelength range.

In this case, the matrix, e.g., created by the matrix creating unit 200, may be applied to the input image, e.g., by the reflectance estimating unit 130, to estimate the spectral reflectance of each wavelength range. The spectral reflectances of adjacent wavelength ranges may overlap each other. Meanwhile, in an embodiment, as described above, the matrix creating system 200 may also be provided in or with the color converting system 100.

The spectral reflectances may be synthesized into one spectral reflectance, e.g., by the reflectance synthesizing unit 140, in operation S630. In an embodiment, the reflectance synthesizing unit 140, for example, may connect the spectral reflectances in the wavelength range that is overlapped by the reflectance estimating unit 130 to remove discontinuous portions of the spectral reflectances.

The synthesized spectral reflectance may further be applied to an image to convert the color of the image, e.g., by the color converting unit 150, in operation S640. In an embodiment, the color converting unit 150 may apply the transmitted spectral reflectance to the image to calculate the CIE XYZ model of the image, and calculates the RGB, CMYK, or CIE LAB model of the image on the basis of the calculated CIE XYZ model.

The image having the converted color may then be forwarded to the image output unit 160, for example, for output, in operation S650.

Figure 7:
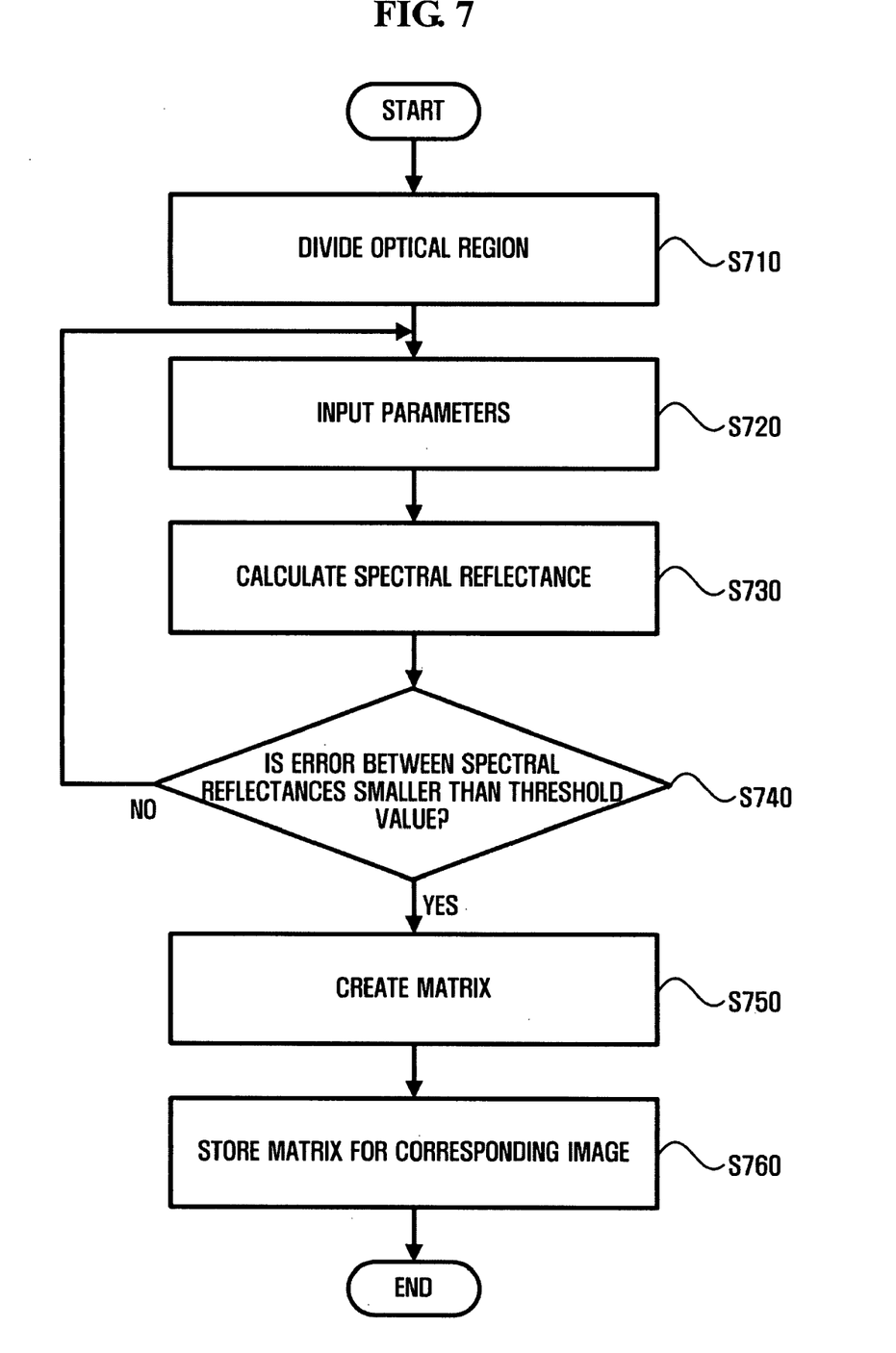
FIG. 7 illustrates a process of creating a matrix, according to an embodiment of the present invention.

FIG. 7 illustrates a process of creating a matrix, according to an embodiment of the present invention.

According to an embodiment, in order to create a matrix, the optical region dividing unit 210 of the matrix creating system 200 may first divide an optical region into one or more wavelength ranges, in operation S710. Here, in such an embodiment, the divided wavelength ranges and the number of wavelength ranges may be determined by the user.

Parameters of a kernel applied to a predetermined image for each wavelength range may be received, e.g., by the parameter input unit 220 from the user, in operation S720. The kernel may be a Gaussian kernel or a polynomial kernel.

In an embodiment, division information of the wavelength ranges, e.g., divided by the optical region dividing unit 210, and the parameter of the kernel, e.g., input through the parameter input unit 200, may be forwarded to the control unit 230, for example, for forwarding to the image analyzing unit 240. Then, in this example embodiment, the image analyzing unit 240 applies the kernel having the parameters applied thereto to the image to calculate the spectral reflectance of the image, in operation S730. Here, the image analyzing unit 240 may calculate the spectral reflectance of each wavelength range based on the transmitted division information of the wavelength ranges.

Using the above example embodiment, the image analyzing unit 240 can apply the kernel to the image by the kernel ridge regression operation to calculate the spectral reflectance in each wavelength range.

The spectral reflectance, e.g., calculated by the image analyzing unit 240, may be forwarded to the control unit 230, for example, where it may be determined whether the error between the calculated spectral reflectance and the spectral reflectance for the corresponding image, which has already been stored in the storage unit, for example, is smaller than or fails to meet the threshold value, in operation S740.

When the error is smaller than or fails to meet the threshold value, the control unit 230 may forward color information of the image and the calculated spectral reflectance to the matrix creating unit 260, for example, for creation of a matrix for converting the spectral reflectance, stored in the storage unit so as to correspond to the image, into the calculated spectral reflectance, in operation S750. Since such a matrix has been described in detail above with reference to FIG. 3, thus further description thereof will be omitted herein.

The matrix created by the matrix creating unit 260 may further be stored, e.g., in the storage unit 250, so as to correspond to the image, in operation S760.

On the other hand, when the error between the spectral reflectances checked by the control unit 230 is larger than or meets the threshold value, the control unit 230 may cause the parameter input unit 220 to receive different parameters for the kernel, e.g., from the user, in operation S720, and forward the parameters to the parameter analyzing unit 240, for example, thereby calculating a new spectral reflectance, in operation S730. This process may be performed until the error is lower than or fails to meet the threshold value. The threshold value may be arbitrarily determined by the user.

As described above, according to a system, medium, and method converting colors of the invention, the following effects may be obtained.

It may be possible to estimate image signals in various illumination environments by using a color signal input to an input system, such as a digital camera, or by estimating the surface spectral reflectance of a subject in every wavelength from a color signal of a general image input to the input system and converting the color signal of the input image into a device-independent color signal.

Further, embodiments of the invention may be applied to various fields, such as a multi-primary display, noting that alternative embodiments are equally available.

It will be understood that blocks of the above flowchart illustrations, and combinations of blocks in the flowchart illustrations can be implemented by computer readable code. This computer readable code can be provided to a processor of a general purpose computer, special purpose computer, or other programmable data processing system to produce a machine, such that the code, which execute via the processor of the computer or other programmable data processing system, create a mechanism for implementing the operations specified in the flowchart block or blocks. This computer readable code may also be stored in a computer usable or computer-readable memory that can direct a computer or other programmable data processing system to operate in a particular manner, such that the code stored in the computer usable or computer-readable memory produce an article of manufacture including instruction mechanism that implement the operations specified in the flowchart block or blocks. The computer readable code may also be loaded onto a computer or other programmable data processing system to cause a series of operational processes to be performed on the computer or other programmable system to produce a computer implemented process such that the code that execute on the computer or other programmable system provide processes for implementing the operations specified in the flowchart block or blocks.

In addition, each block or step of the block diagrams may represent a module, segment, or portion of code, which comprises one or more executable instructions for implementing the specified logical operation(s). It should also be noted that in some alternative implementations, the operations noted in the blocks may occur out of order. For example, two blocks shown in succession may in fact be executed substantially concurrently, blocks may sometimes be executed in reverse order depending upon the functionality involved, or partial portions of blocks may be executed at the same time as portions of other blocks.

With this being said, embodiments of the present invention can further be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A color converting system including at least one processing device, the system comprising:
    a reflectance estimating unit that estimates spectral reflectances of an image in plural wavelength ranges, wherein one or more adjacent wavelength ranges of the plural wavelength ranges overlap;
    a reflectance synthesizing unit that synthesizes the estimated spectral reflectances into one spectral reflectance by removing a discontinuity of spectral reflectances within the one or more overlapping wavelength range; and
    a color converting unit, using the at least one processing device, that converts the image into a different color model based on the synthesized spectral reflectance,
    wherein each wavelength range includes a plurality of colors.

2. The color converting system of claim 1, wherein the reflectance estimating unit applies a matrix, previously created from the one or more wavelength ranges, to the image to estimate the spectral reflectances.

3. A color converting system, comprising:
    a reflectance estimating unit that estimates spectral reflectances of an image in one or more wavelength ranges;
    a reflectance synthesizing unit that synthesizes the estimated spectral reflectances into one spectral reflectance by removing a discontinuity of spectral reflectances within the one or more overlapping wavelength range; and
    a color converting unit that converts the image into a different color model based on the synthesized spectral reflectance, wherein the color converting unit calculates a CIE (Commission International de l'Echairage) XYX model using the spectral reflectance and calculates an RGB, CMYK, or CIE LAB model of the image based on the CIE XYZ model,
    wherein each wavelength range includes a plurality of colors.

4. The color converting system of claim 1, wherein the reflectance synthesizing unit connects spectral reflectances of the overlapping adjacent wavelength ranges to remove the discontinuity of the spectral reflectances of the overlapping adjacent wavelength ranges.

5. A color converting method comprising:
   estimating spectral reflectances of an image in plural wavelength regions, wherein one or more adjacent wavelength ranges of the plural wavelength ranges overlap;
   synthesizing the estimated spectral reflectances into one spectral reflectance by removing a discontinuity of sprectral reflectances within the one or more overlapping wavelength range; and
   applying the synthesized spectral reflectance to the image to convert the image into a different color model,
   wherein each wavelength range includes a plurality of colors.

6. The color converting method of claim 5, wherein the estimating of the spectral reflectances comprises applying a previously created matrix, previously created in the one or more wavelength regions, to the image to estimate the spectral reflectances.

7. The color converting method of claim 5, wherein the converting of the image comprises:
   calculating a CIE XYZ model of the image based on the spectral reflectances; and
   calculating an RGB, CMYK, or CIE LAB model of the image based on the CIE XYZ model.

8. The color converting method of claim 5, wherein the synthesizing of the spectral reflectances comprises connecting spectral reflectances of the overlapping adjacent wavelength ranges to remove the discontinuity of the spectral reflectances of the overlapping adjacent wavelength ranges.

9. At least one non-transitory medium comprising computer readable code to control at least one processing element to implement the method of claim 5.

10. The color converting system of claim 1, wherein the color converting unit calculates a CIE (Commission International de l'Echairage) XYX model using the spectral reflectance and calculates an RGB, CMYK, or CIE LAB model of the image based on the CIE XYZ model.

11. The color converting system of claim 1, wherein the color converting unit applies the synthesized spectral reflectance to the image to generate a device-independent color model, and then converts the image into the different color model from the device-independent color model.

12. The color converting method of claim 5, further comprising applying the synthesized spectral reflectance to the image to generate a device-independent color model, and converting the image into the different color model from the device-independent color model.

* * * * *

UNITED STATES PATENT AND TRADEMARK OFFICE
CERTIFICATE OF CORRECTION

PATENT NO. : 8,363,931 B2
APPLICATION NO. : 11/819296
DATED : January 29, 2013
INVENTOR(S) : Jae-hyun Kwon et al.

It is certified that error appears in the above-identified patent and that said Letters Patent is hereby corrected as shown below:

In the Claims

Column 10, Line 57, In Claim 3, delete "de l'Echairage)" and insert -- de l'Eclairage) --, therefor.

Column 11, Line 6-7, In Claim 5, delete "sprectral" and insert -- spectral --, therefor.

Column 12, Line 9, In Claim 10, delete "de l'Echairage)" and insert -- de l'Eclairage) --, therefor.

Signed and Sealed this
Fifteenth Day of October, 2013

Teresa Stanek Rea
*Deputy Director of the United States Patent and Trademark Office*